(12) United States Patent
Varnier et al.

(10) Patent No.: US 12,258,013 B2
(45) Date of Patent: Mar. 25, 2025

(54) METHOD AND DEVICE FOR PARTITIONING A WIDENED AREA OF A TRAFFIC LANE BOUNDED BY TWO EDGES

(71) Applicant: PSA AUTOMOBILES SA, Poissy (FR)

(72) Inventors: Matthieu Varnier, La Verriere (FR); David Giraud, Chatenay Malabry (FR); Zoubida Lahlou, Lissasfa Casablanca (MA)

(73) Assignee: PSA AUTOMOBILES SA, Poissy (FR)

( * ) Notice: Subject to any disclaimer, the term of this patent is extended or adjusted under 35 U.S.C. 154(b) by 186 days.

(21) Appl. No.: 18/022,731

(22) PCT Filed: Jul. 26, 2021

(86) PCT No.: PCT/FR2021/051391
§ 371 (c)(1),
(2) Date: Feb. 22, 2023

(87) PCT Pub. No.: WO2022/053749
PCT Pub. Date: Mar. 17, 2022

(65) Prior Publication Data
US 2023/0311868 A1    Oct. 5, 2023

(30) Foreign Application Priority Data
Sep. 10, 2020  (FR) ....................... 2009153

(51) Int. Cl.
*B60W 30/12*    (2020.01)

(52) U.S. Cl.
CPC ....... *B60W 30/12* (2013.01); *B60W 2510/202* (2013.01); *B60W 2552/53* (2020.02)

(58) Field of Classification Search
CPC ............. B60W 30/12; B60W 2552/53; B60W 2520/10; B60W 2540/18; B60W 2540/20;
(Continued)

(56) References Cited

U.S. PATENT DOCUMENTS 9,542,606 B2 *  1/2017  Ishigami ................... G06T 7/60
9,714,034 B2 *  7/2017  Otake ............. B60W 30/18154
(Continued)

FOREIGN PATENT DOCUMENTS

FR    3069222 A1    1/2019

OTHER PUBLICATIONS

International Search Report for PCT/FR2021/051391 mailed Nov. 11, 2021.
Written Opinion for PCT/FR2021/051391 mailed Nov. 11, 2021.

*Primary Examiner* — Hai H Huynh
(74) *Attorney, Agent, or Firm* — Sandberg Phoenix and von Gontard PC

(57) ABSTRACT

A method and a device are disclosed for partitioning a widened area of a limited traffic lane bounded by two edges, and through which a vehicle can be driven by a driver in an automated manner along a reference path, said vehicle comprising a lateral positioning aid with respect to the reference path. The method comprises detecting a lane split, determining a widened area (204), determining a plurality of reference paths, and partitions the widened area into a plurality of sub-areas according to the determined reference paths.

12 Claims, 4 Drawing Sheets

(58) Field of Classification Search
CPC . B60W 2554/4041; B60W 2554/4042; B60W 2554/406; B60W 2555/60
USPC .................................................... 701/41–44
See application file for complete search history.

(56) References Cited

U.S. PATENT DOCUMENTS

| | | | | |
|---|---|---|---|---|
| 9,963,144 | B2* | 5/2018 | Nakamura | B60W 30/12 |
| 9,965,691 | B2* | 5/2018 | Kawasaki | G06V 20/588 |
| 10,611,374 | B2* | 4/2020 | Sato | B60W 30/12 |
| 11,230,291 | B2* | 1/2022 | Fukuda | G05D 1/0219 |
| 11,598,648 | B2* | 3/2023 | Pietruska | B60W 60/001 |
| 11,926,339 | B2* | 3/2024 | Han | G01C 21/3658 |
| 12,007,243 | B2* | 6/2024 | Zhen | G01C 21/3819 |
| 2008/0208460 | A1* | 8/2008 | Nakao | G01C 21/3602 701/532 |
| 2011/0010021 | A1* | 1/2011 | Kobayashi | B62D 15/025 701/1 |
| 2015/0307130 | A1* | 10/2015 | Kimura | B62D 15/025 701/41 |
| 2017/0057543 | A1* | 3/2017 | Sakaguchi | B62D 15/029 |
| 2017/0066445 | A1* | 3/2017 | Habu | B60W 30/165 |
| 2017/0091564 | A1* | 3/2017 | Kawasaki | G01C 21/30 |
| 2019/0176831 | A1 | 6/2019 | Moon et al. | |

* cited by examiner

[Fig. 1]
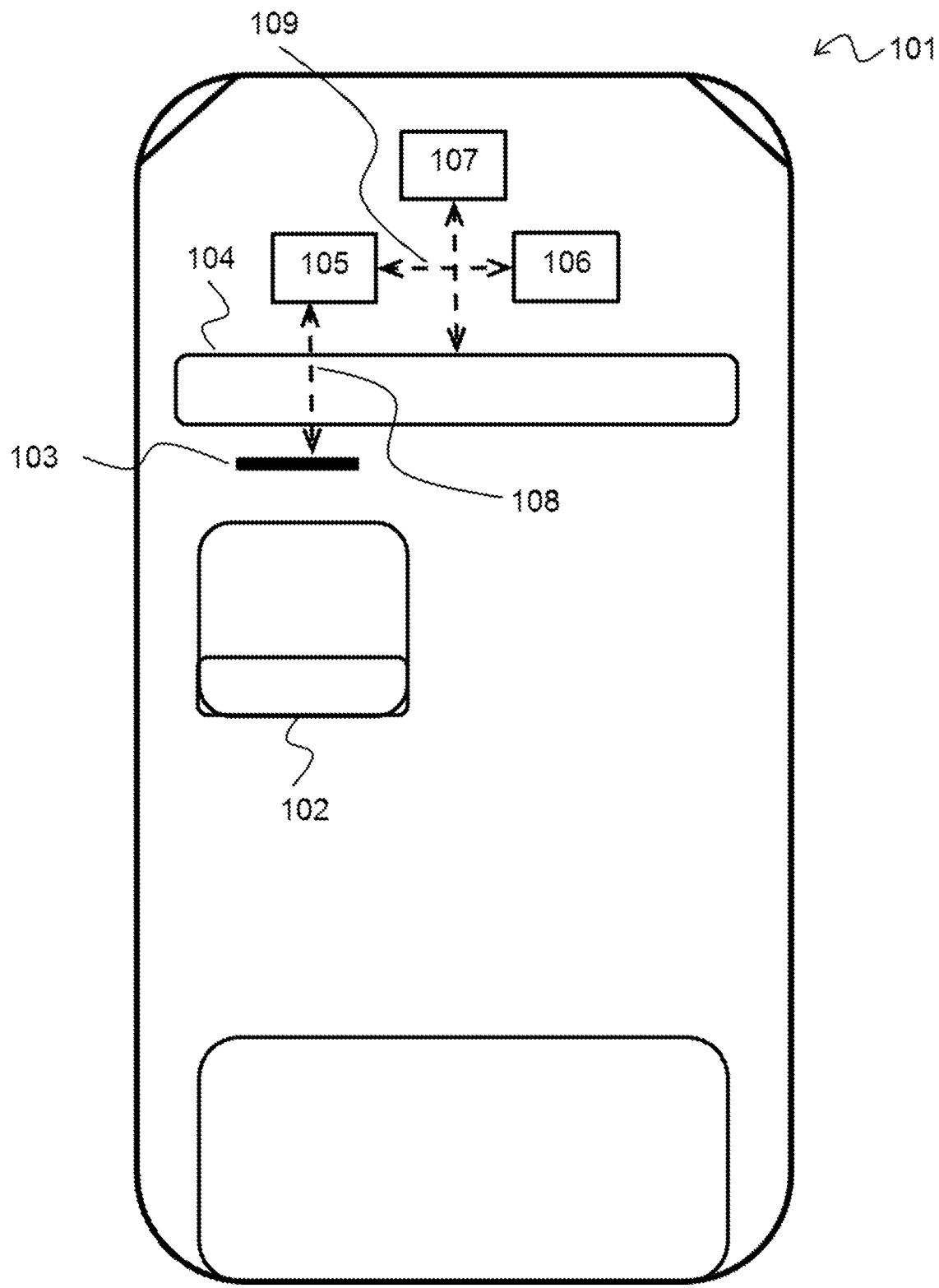

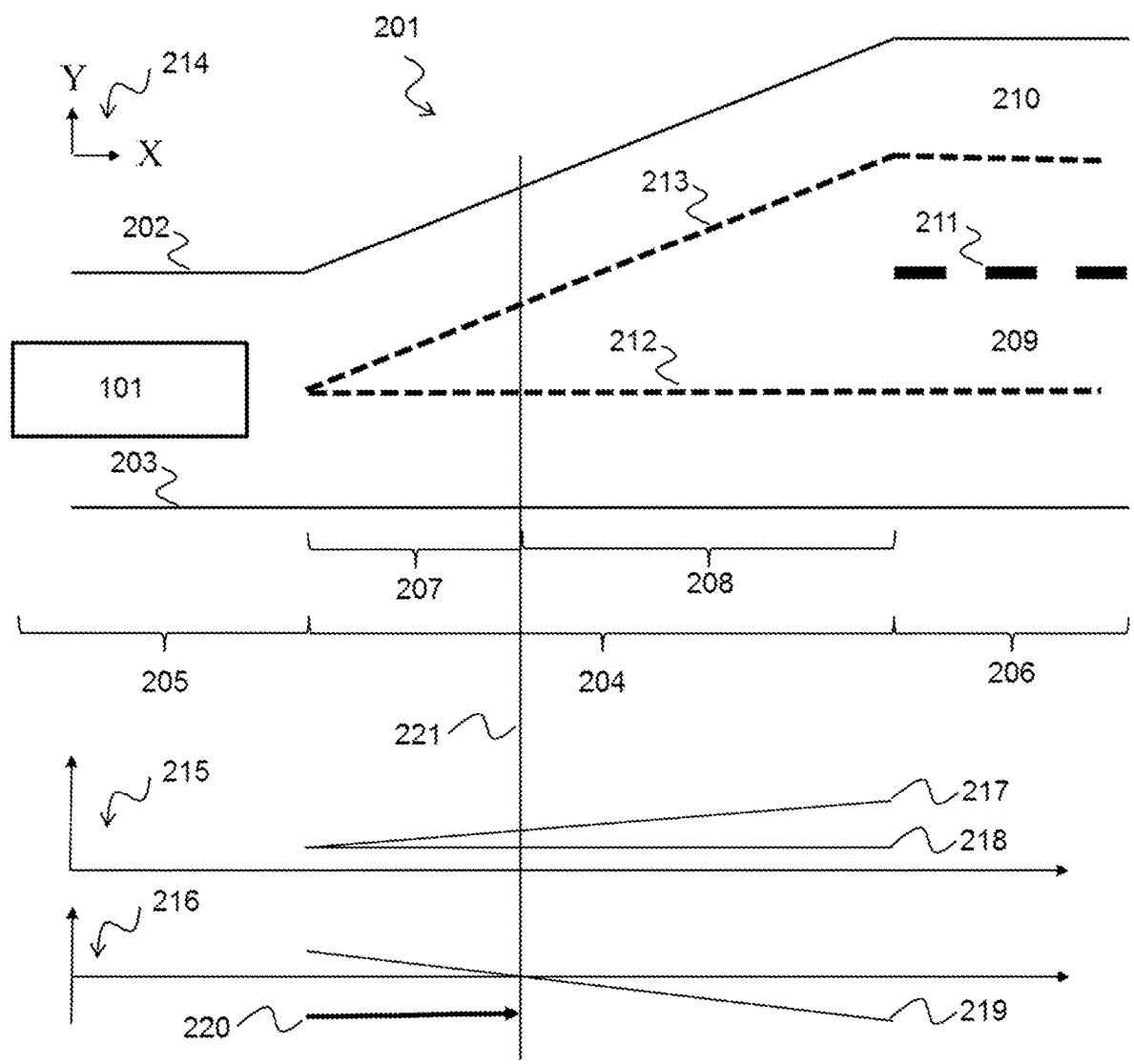
[Fig. 2]

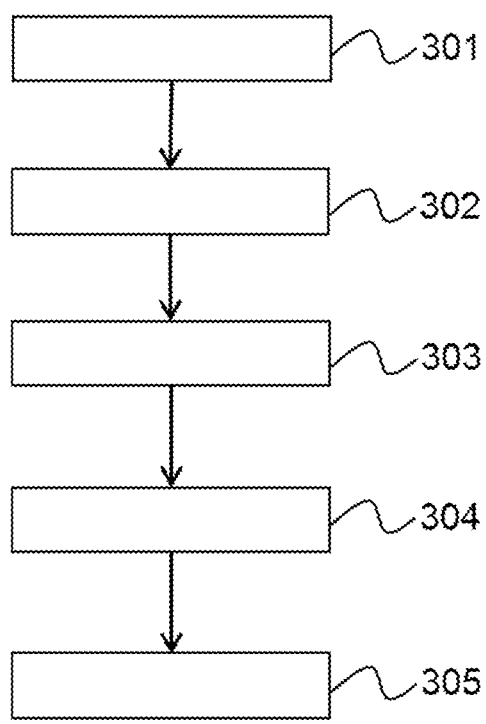
[Fig. 3]

[Fig. 4]
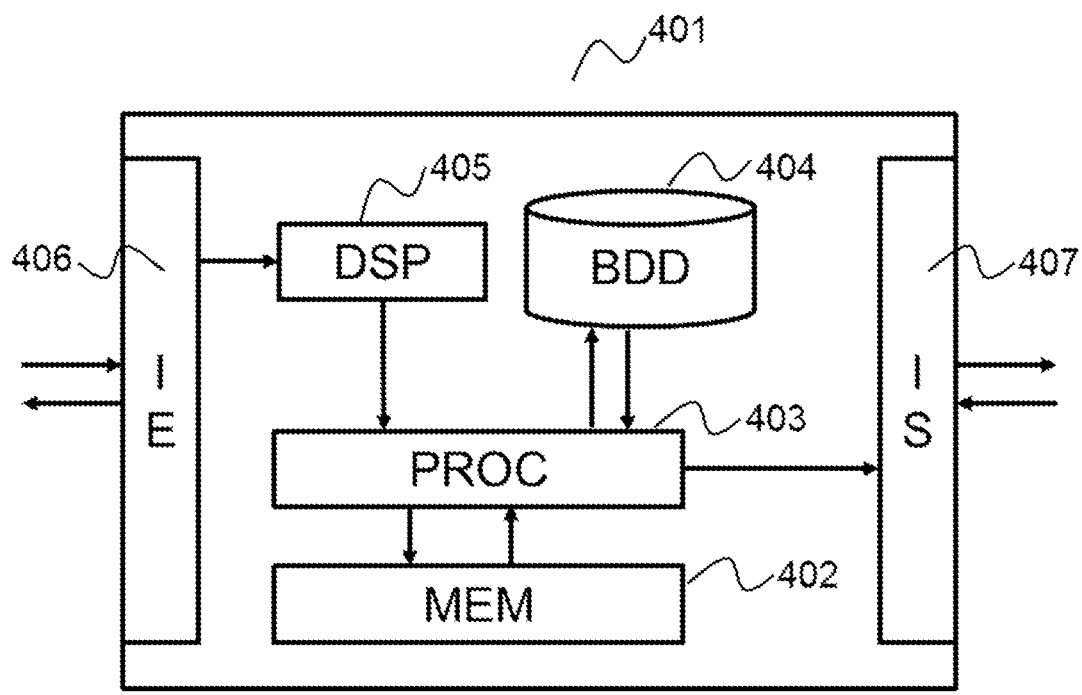

METHOD AND DEVICE FOR PARTITIONING A WIDENED AREA OF A TRAFFIC LANE BOUNDED BY TWO EDGES

CROSS-REFERENCE TO RELATED APPLICATIONS

This application is the US National Stage under 35 USC § 371 of International Application No. PCT/FR2021/051391, filed 26 Jul. 2021 which claims the priority of French App. No. 2009153 filed on 10 Sep. 2020, the content (text, drawings and claims) of both said applications being incorporated here by reference.

BACKGROUND

Disclosed are a method and a device for partitioning a widened area of a traffic lane bounded by two edges.

It is known that vehicles, more particularly automobiles, are able to be driven by a driver in an automated manner in a traffic lane along a reference path, said traffic lane being limited laterally by two edges, a right edge and a left edge. The edges may be markings on the ground, sometimes called border lines. Also, the edges are recognizable, for example, using image processing that identifies a change of material, color and/or texture of the ground.

The longitudinal demarcation of a traffic lane is bounded by a distance between two points, between two transverse axes, a distance between the beginning and the end of the lane. An area, region, or portion of a traffic lane is represented by the surface of the traffic lane bounded laterally and longitudinally.

A traffic lane may at a given location split into two or more lanes. This multiplication of the lanes can allow a vehicle, traveling in said traffic lane, to pass another vehicle in front of it or to position itself on the most suitable side relative to the traffic or relative to the trajectory desired by the driver of the vehicle.

The widened area of a traffic lane is bounded longitudinally by the region where the width of the lane increases. It begins where the width of the lane begins to increase, therefore after an initial lane, and it ends where a marking indicates the splitting of the lanes created by the widening of the initial lane.

Vehicles, in particular automobiles, travel in these lanes. Certain vehicles, operated by a driver, are able to be driven in an automated manner along a reference path. They comprise a lateral positioning aid device with respect to the lateral borders of the traffic lane taken. This device comprises means capable of perceiving the environment (camera, RADAR, LIDAR and other rangefinders) and in particular the edge of the lane over a given horizon or a given distance.

It is known that these said vehicles are able to detect the beginning of a widened area by monitoring the lateral distance between the two edges of the lane. Due to the limit of perception of the environment over a given distance by the members capable of environmental perception, determining the end of the widened area as soon as the start of said widened area is detected is not possible if the marking, which marks the splitting of the lanes created by the widening of the initial lane, is not detected by said members. It is known that the determination of the end of the widened area is carried out during the travel of said vehicle in the widened area, for example until a new marking is detected which marks the splitting of the lanes created by the widening of the initial lane.

Certain lateral positioning aid devices take as a reference path the median to the edges of the traffic lane. When this occurs, the vehicle will be incorrectly positioned at the end of the traffic lane widened area. It will be placed between the two new lanes, therefore at the splitting marking which will be created between these two lanes. The driver will have to resume manual operation and perform a late lateral movement with a risk of colliding with another passing vehicle.

Other lateral positioning aid devices take as a reference path a fixed distance relative to one edge of the traffic lane. However, the selected trajectory may not be the trajectory desired by the driver. The choice of the final traffic lane by the lateral positioning aid device, at the end of the widening and the splitting into at least two lanes, will be seen as arbitrary from the point of view of the driver. If appropriate, he will then have to suspend the assistance in the widened area in order to resume driving manually, then reactivate the assistance after the end of the widened area.

Furthermore, said devices do not make it possible to take into account several reference paths in the widened area.

SUMMARY

An object is to improve comfort, relevance (intuitive nature), and safety of driving assistance devices.

To this end, we propose a method for partitioning a widened area of a traffic lane bounded by two edges, wherein a vehicle is able to be driven by a driver in an automated manner along a reference path in said traffic lane, said vehicle comprising a lateral positioning aid with respect to the reference path, said method comprising the steps of:
  detecting a next splitting of said traffic lane into at least two new lanes;
  determining the widened area of said traffic lane;
  determining, in said widened area, reference paths capable of reaching each new lane;
  calculating a longitudinal distance relative to the beginning of said widened area, said longitudinal distance being a function of the reference paths and the edges of said traffic lane;
  determining a first sub-area of said widened area included between the beginning of said widened area and said longitudinal distance; a second sub-area being determined as a complement of said first sub-area relative to the widened area.

Thus, several reference paths are determined. Depending on the selected reference path, the vehicle is able to reach, in an automated manner, each new lane after the widened area. However, the closer the vehicle is to the end of the widened area, the greater the change in reference path, and therefore a change in the trajectory of the vehicle will be dangerous (that is, there will be risk of collision with another vehicle for example).

It is then necessary to partition, or demarcate, the widened area into two sub-areas. A first sub-area represents a region where substantially the lateral distance between the reference paths is small, and a second sub-area represents a region where the lateral distance between the reference paths becomes greater and greater.

The demarcation of the sub-areas depends on the reference paths and on the edges of the traffic lane. This also makes it possible to accurately and systematically demarcate (partition) the widened area of the traffic lane into two distinct sub-areas.

This demarcation is carried out by the traveling vehicle and can be updated while the vehicle is in the widened area if new elements are detected or specified as the end of the widened area.

In one embodiment, this function depends on the lateral variance between the edges and/or the reference paths.

This partitioning is the best compromise between the cost and the complexity of the environmental perception devices to be provided, thus offering positive effects on comfort and safety.

Advantageously, the longitudinal distance is a function of at least one element selected from the following:

The geometry of the vehicle;
The geometry of the traffic lane;
A margin, an offset, and/or a predetermined value;
The vehicle speed;
The traffic conditions.

Taking these elements into account contributes, on the one hand, to improving comfort by better calculation of the reference path, and, on the other hand, to improving the feeling of security by a partitioning adapted to the uncertainties and context of the traffic.

Taking into account the geometry of the vehicle (for example width, length) and the geometry of the traffic lane, in particular the half-width of the traffic lane (called the initial traffic lane, or upstream traffic lane) just before the widened area, improves the calculation of the reference paths (precision, smoothing).

Taking into account a margin, an offset, and/or a predetermined value, such as the theoretical lane width or the traffic side, makes the calculation of the longitudinal distance relative to the uncertainties related to the measurements of the perception sensors more robust. Depending on design choices, a predetermined value typifies the driving assistance function by making it more or less sporty, more or less comfortable, etc.

Taking into account the speed of the vehicle, or conditions related to the vehicle dynamics, such as its positioning, its speeds and accelerations, as well as taking into account the traffic conditions make it possible to adapt the calculation of the longitudinal distance as a function of the traffic.

Advantageously, the determination of the widened area is updated as long as the vehicle has not left the widened area. It is not necessary to know or identify the end of the widened area in order to be able to determine the reference paths. These can be determined according to the visible horizon from the environmental perception sensors. Thus, it is not necessary to know and/or identify the end of the widened area in order to be able to determine the first sub-area.

Advantageously, the first reference path is determined from one of the two edges of the traffic lane, and the second reference path is determined from the other edge of the two edges of the traffic lane. Thus, the method is easily adaptable according to right hand or left hand traffic, and this requires fewer computing resources to implement the method. Right hand traffic or left hand traffic, respectively, means the geographical areas where laws require driving on the right or left, respectively, in the lane except for passing or changing lanes.

Advantageously, the calculation of the longitudinal distance relative to the beginning of said widened area is a function of the width of the lane relative to the width of the vehicle. Thus, this requires fewer computing resources to implement the method.

Advantageously, when the vehicle is in the first sub-area, the method further comprises a step of selecting a first reference path from the determined reference paths, the selection being made from information acquired by at least one sensor of said vehicle, and, when the vehicle is in the second sub-area, the method further comprises a step of selecting a second reference path from the determined reference paths, the selection being made only from at least one action on the steering wheel by the driver.

Thus, in the first sub-area, where the lateral distance between the reference paths is close, it is possible to adapt the driving aids, such as the lateral positioning, depending on the perceived environment without compromising the comfort or safety felt by the driver and/or the passengers. The vehicle will be able to change lanes automatically without any noticeable action of the driver on the steering wheel (variation in rotation of the steering wheel or the steering wheel torque greater than a predetermined threshold).

In the first sub-area, the width of the path remains sufficiently small to avoid being passed by another vehicle. Thus, there is only very little risk of a collision during the automatic lateral positioning modification. It is not useful for the vehicle to be over-equipped with additional sensors to measure and analyze in real time what happens behind the vehicle.

On the other hand, if the vehicle is in the second sub-area, driving assistance adaptation, such as lateral positioning, must only be done through an action of the driver (and not simply a constraint of the environment). The driver then takes the responsibility for the change in trajectory, in particular against the increased risk of collision. This change in reference trajectory, through the action of the driver and by the driver, is then easily understandable because it is initiated by the user—thus avoiding a feeling of insecurity. Advantageously, information acquired by at least one sensor of said vehicle includes the activated side turn signal, another vehicle in front of and traveling more slowly than said vehicle, a speed of said vehicle lower than a setpoint of the vehicle, and/or the lateral position of said vehicle in the widened area of said traffic lane, and, an action on the steering wheel by the driver is a rotation of the steering wheel and/or a torque applied to the steering wheel.

When the driver detects a split, he may want his vehicle to go onto one of the new lanes. For example, he may want to pass a vehicle in front of him.

In the case of a positioning aid in the lane, in the first sub-area, it is possible to automatically change the reference path depending on the traffic perceived by the environment sensors or according to the driver's instructions (such as for example activation of the turn signal and/or of a button). It is a simple way for the driver to indicate, in the first sub-area, in which lane, ego-lane or adjacent lane, he wishes the vehicle to be at the end of the widened area (therefore the start of the downstream area). The driver therefore removes the uncertainty in the selection of the reference path without action on the steering wheel (variation of the angle of rotation of the steering wheel and/or of the torque on the steering wheel below a predetermined threshold).

However, in the second sub-area, unless it causes discomfort and a feeling of insecurity, the driver must perform a significant action (minimum angle and/or speed of rotation of the steering wheel, applying a steering wheel torque beyond a threshold, etc.) in order to change the reference trajectory.

In one embodiment, a vehicle driven in an automated manner may have speed regulated relative to a set speed. In the upstream area of the widened area, the vehicle may be regulated at a speed lower than the set speed due to detection of a vehicle in front and traveling more slowly. The arrival in a widened area then allows a slower vehicle to be passed. When the vehicle is in the widened area, the method may choose the reference path enabling the preceding vehicle to be passed in a relaxed (smooth transition) and safe manner.

In another embodiment, the set speed in the upstream area may be different from the set speed in the downstream area of the widened area. Depending on the variance in the speed of the vehicle and the speed setpoints, the selection of the reference path is different: for example, selecting the ego-lane as reference path if the setpoint speed in the downstream area is lower than the speed of the vehicle (such as arriving at a toll gate on a freeway), and selecting the adjacent lane as reference path if the setpoint speed in the upstream area is higher than the vehicle speed (such as acceleration lane for passing).

Also disclosed is device for partitioning a widened area of a traffic lane bounded by two edges, said device comprising a memory associated with at least one processor configured to implement the method.

Additionally, a vehicle is disclosed which comprises the device for partitioning a widened area of a traffic lane bounded by two edges.

Lastly, a computer program is disclosed comprising instructions suitable for the execution of the steps of the method for partitioning a widened area of a traffic lane bounded by two edges when said program is executed by at least one processor.

DESCRIPTION OF THE FIGURES

Other features and advantages of the method and devices will become apparent from the description of the non-limiting embodiments thereof as set forth below, with reference to the appended figures, in which:

FIG. 1 schematically shows a vehicle.

FIG. 2 schematically shows a partitioning of a widened area of a traffic lane.

FIG. 3 schematically shows a partitioning method.

FIG. 4 schematically shows a computer which can carry out the method.

DETAILED DESCRIPTION

FIG. 1 shows a vehicle 101 where a seat 102, a steering wheel 103, a dashboard 104, and a safety belt (not shown) constitute the driving position. According to one embodiment, the dashboard 104 comprises a cockpit, a multimedia system capable of displaying audio-visual information, a heads-up display system, and/or an air-conditioning/ventilation system. The passenger seats are not represented.

According to another embodiment, the steering wheel 103 and/or the dashboard 104 comprises at least one enclosure, comodo, which groups together different motor vehicle controls: horn, turn signal lights, windshield wiper, high beams, low beams, position lights, activation/deactivation of driving aids such as speed regulator, lane keeping assistance, etc., adjustments and/or setting of driving aids, etc.

In one embodiment, the vehicle 101 comprises steering assistance members 105 capable of measuring or estimating a steering wheel angle/speed/rotation/torque from an action on the steering wheel by the driver. These members are also able to measure and/or estimate linear or angular movements/speeds/accelerations, and/or to measure and/or estimate forces on the steering system (i.e., steering wheel, column, pinion, rack, tie-rod, joints, tires, etc.).

These members 105 are also able to control steering assistance in order to be able to participate in a lateral positioning aid system.

In one embodiment, these members 105 are of the Electronic Steering Assistance type, of the hydraulic assistance type and/or of the "by-wire" type (in which there is no direct mechanical link between the steering wheel and the tires).

In one embodiment, the vehicle 101 comprises members 106 able to drive the vehicle 101 in an automated manner along a reference path in a traffic lane. In particular, these members 106 offer lateral positioning aid to the vehicle's driver with respect to a reference path.

In one embodiment, these members 106 comprise means for perceiving the environment of the vehicle. These means can process light waves (camera, laser, lidar, etc.), radio frequency waves (RADAR, Wi-Fi, 4G, 5G, xG, etc.) and acoustic waves (ultrasound, etc.). These members 106 are then able to communicate with the vehicle's exterior (with other vehicles, with connected objects such as a telephone, a computer, etc., with stations along the side of the road, with servers, etc.). In particular, these members 106 can recognize a traffic lane, road edges and ground markings, objects (e.g., pedestrian, cyclist, automobile, truck, etc.) traveling in the vicinity or in the traffic lane around the vehicle;

In one embodiment, the vehicle 101 comprises at least one device 107, a computer for example, comprising a memory associated with at least one processor configured to implement the method.

In one embodiment, the device 107 automatically drives the vehicle 101 in a traffic lane along a reference path. The device 107 comprises environmental perception members, human-machine interface members, and control of the vehicle members 101.

The environmental perception members are capable of:
perceiving the external or road environment using devices such as RADAR, LIDAR, ultrasound, laser, image/video acquisition, or other rangefinders;
perceiving the interior environment of the vehicle 101 using position sensor type devices, camera, driver and/or passengers monitoring devices.

The human-machine interface members are capable of:
communicating with the driver and/or the passengers in order either to report to the occupants of said vehicle 101, or to receive wishes or commands from the occupants of said vehicle 101;
communicating with the other vehicles, with the infrastructure, with people outside the vehicle 101 using so-called V2X communications based on wireless technologies such as WIFI, 4G, 5G, in order either to report information to or receive information from the other vehicles, from the infrastructure and/or with people outside of said vehicle 101.

The control members of the vehicle 101 are able to monitor, control or regulate:
the longitudinal, transverse and/or vertical dynamics of said vehicle 101 (for example, these members may be brakes, steering, suspensions, the engine, etc.);
comfort and safety of the vehicle 101.

Communication channels 108 and 109 partly illustrate the communications and exchanges of information on a wired type network such as CAN, FlexRay, Ethernet, etc. networks of optical type, or of radiofrequency type such as WIFI, 4G, 5G, etc. These communication channels allow information exchanges between the device 107 and the other members (seat 102, safety belt, steering wheel 103, dashboard 104, multi-media system, indicator lights, screens, air conditioning/ventilation, steering assistance members 105, members 106 capable of driving the vehicle 101 and any device 107 participating in the implementation of the method).

FIG. 2 shows the vehicle 101 traveling in a traffic lane 201 bounded by two edges, a left edge 202 and a right edge 203.

The traffic lane 201 is divided into several areas. A first area 204 corresponds to the widened area of the traffic lane. An upstream area 205 corresponds to the area of the traffic lane upstream of the widened area 204. The traffic lane upstream of the widened area 204 is also called the initial lane. A downstream area 206 corresponds to the area of the traffic lane downstream of the widened area 204. The beginning of the widened area 204 corresponds to the end of the upstream area 205. The end of the widened area 204 corresponds to the beginning of the downstream area.

The widened area 204 is partitioned into two sub-areas, a first sub-area 207 and a second sub-area 208. FIG. 2 shows a partitioning line 221 separating the first sub-area 207 from the second sub-area 208.

The area 206 downstream of the widened area 204 is divided into two lanes, an ego-lane 209 and an adjacent lane 210. The line 211 represents a marking on the ground separating the ego-lane 209 from the adjacent lane 210.

FIG. 2 also shows the reference path 212 to reach the ego-lane, and the reference path 213 to reach the adjacent lane.

FIG. 2 shows three references 214, 215, 216. The reference 214 gives a longitudinal and transverse direction making it possible to perform the distance calculations.

A result of calculating a first lateral distance 217 between the reference path 213 of the adjacent lane 210 and the right edge 203 of the traffic lane is represented in reference 215. A result of calculating a second lateral distance 218 between the reference path 212 of the ego-lane 209 and the right edge 203 of the traffic lane is also represented in reference 215.

In reference 216, a segment 219 represents the result of a function of the first lateral distance 217 and the second lateral distance 218. By way of illustration, this function is the sum of the second lateral distance 218, of a half-width of the initial lane, and of the opposite (reverse sign) of first lateral distance 217. The length of a vector 220 represents the calculation of the longitudinal distance relative to the beginning of said widened area. A line 221 shows the longitudinal distance transferred to the widened area 204.

The first sub-area 207, belonging to the widened area 204, is thus limited transversely by the edges 202 and 203, and is limited longitudinally by the beginning of the widened area 204 and the line 221.

In FIG. 2, the reference path used by the lateral positioning aid before the widened area is not represented.

FIG. 3 schematically shows a method for partitioning a widened area 202 of a traffic lane 201 bounded by two edges 202, 203, according to a particular embodiment. A vehicle 101 capable of being driven by a driver in an automated manner along a reference path is traveling in said traffic lane, said vehicle comprising a lateral positioning aid relative to the reference path.

Step 301 detects a next splitting of the traffic lane into at least two new lanes, including an ego-lane 209 and an adjacent lane 210.

Advantageously, the detection of the next splitting is carried out by environmental perception means. In one embodiment, the processing of images acquired by a camera makes it possible to identify, recognize and locate the marking on the ground. The lane width on which the vehicle travels over a horizon is determined. The monitoring of the variation in the width of the lane is an indicator of splitting of the lane. Also, tracking the marking on the ground makes it possible to identify a splitting of the lane with the appearance of an additional marking.

Advantageously, the combination of measurements coming from different environmental perception means and location means (GPS associated with mapping for example) makes detection more robust.

Step 302 determines the widened area 204 of the traffic lane 201. Advantageously, with the marking identification on the ground and the edges of the lane and with the monitoring of the width of the lane, the widened area 204 is determined. In one embodiment, this determination is consolidated and finalized while the vehicle is in the widened area. In another embodiment, this determination is carried out while the vehicle is traveling. This determination is updated while the vehicle is in the widened area 204 when new elements are detected as a new marking, indicating the splitting of the lanes created by the widening of the lane. In another embodiment, the widened area 204 is entirely determined from the beginning of the entry of this area using the location device associated with maps, or geometric data, of the lane.

Step 303 determines, in said widened area 204, reference paths 212, 213 capable of reaching each new lane 209, 210. In one embodiment, a reference path 212 is determined in order to reach the ego-lane 209, and another reference path 213 is determined in order to reach the adjacent path 210. The term "ego-lane" is understood to mean the preferential or default lane of the lateral positioning aid during a lane split. Generally, it is the right-hand lane in the event of right-hand traffic or the left-hand lane in the event of left-hand traffic. The adjacent lane is the lane next to the ego-lane.

According to one embodiment, a reference path 212, 213 in the widened area 204 leading to one of the lanes 209, 210 derived from the splitting of the current lane may be created as the shortest path between the reference path of the lane just before the widened area and the reference path of the new lane after the widened area.

According to another embodiment, the reference path is the shortest path which respects the curvature of the road and/or the trajectory planning criteria (shorter distance, lower acceleration, lower consumption, etc.).

According to another embodiment, a first reference path is determined from the right edge of the traffic lane. By way of illustration, this determination may correspond to a transverse variance of a half-width of the initial lane relative to the edge of the traffic lane. If the width of the lane furthest to the right among the new lanes created at the end of the widened area is identical to the width of the initial lane, the first reference path connects the center of the initial lane to the center the rightmost lane among the new lanes created at the end of the widened area while respecting the curvature of the road.

According to another embodiment, a second reference path is determined from the left edge of the traffic lane. By way of illustration, this determination may correspond to a variance of a half-width of the initial lane relative to the left edge of the traffic lane. If the width of the leftmost lane among the new lanes created at the end of the widened area is identical to the width of the initial lane, the second reference path connects the center of the initial lane to the center the leftmost lane among the new lanes created at the end of the widened area while respecting the curvature of the road.

According to another embodiment, the reference path to reach the ego-lane 209 is a function of the edge closest to the ego-lane. In particular, the reference path to reach the ego-lane 209 is a fixed distance, for example the half-width of the initial lane, relative to the right-hand lane in the event of right-hand traffic and the left-hand lane in the event of a left-hand traffic. In this case, it is not necessary to recognize and/or identify the advance of the end of the widened area. This reference path is determined as far as the edges of the traffic lane are detected.

According to another embodiment, the reference path to reach the adjacent lane 210 is a function of the edge closest to the adjacent lane. In particular, the reference path to reach the adjacent lane 210 is a fixed distance, for example the half-width of the initial lane, relative to the left-hand lane in the event of right-hand traffic and the right-hand lane in the event of a left-hand traffic.

Step 304 comprises calculating a longitudinal distance relative to the beginning of said widened area, said longitudinal distance being a function of the reference paths 212, 213 and of the edges 202, 203 of the traffic lane.

In one embodiment, one of the edges 202, 203 of the traffic lane is selected, for example edge 202. A first lateral distance 217 is calculated from a first reference path and from the selected edge 202; this corresponds to the lateral variance between the first reference path and the selected edge 202. A second lateral distance 218 is calculated from the second reference path 213 and the selected edge 202. This corresponds to the lateral variance between the second reference path 213 and the selected edge 202. In this particular embodiment, shown in FIG. 2, the longitudinal distance is defined when the difference between the second lateral distance 218 and the first lateral distance 217, and increased by an offset such as the half-width of the initial lane, becomes negative.

Advantageously, this longitudinal distance depends on the geometry of the vehicle and in particular on the width of the vehicle. The longitudinal distance may be greater for a wider vehicle. A wider vehicle in the widened area 204 leaves less space to be passed.

Advantageously, this longitudinal distance is a function of the geometry of the traffic lane. For example, in the event of a non-constant variation in the traffic lane width, the longitudinal distance will have to be adapted or even reduced to zero.

Advantageously, this longitudinal distance is a function of a margin, an offset and/or at least a predetermined value. In one particular case, the longitudinal distance is defined when the difference between the first lateral distance 217 and the second lateral distance 218 exceeds a threshold. This takes into account uncertainties about the measurements used for the detection, determination and calculation steps. In another embodiment, depending on the predetermined value, the method is more or less reactive.

Advantageously, this longitudinal distance is a function of the speed (position, acceleration and/or jerk) of the vehicle. In particular, a change in driving assistance in the first sub-area will be felt more by the driver, which may give an impression of discomfort or lack of safety.

Advantageously, this longitudinal distance is a function of the traffic conditions. In particular, during heavy traffic, it is preferable to reduce the first sub-area 207.

Step 305 determines a first sub-area 207 of the widened area 204 between the beginning of the widened area 204 and said longitudinal distance. The determination of the second sub-area 208 corresponds to the complement of the first sub-area 207 relative to the widened area 204. Advantageously, the sub-area 207 is the first longitudinal part of the widened area.

In another embodiment, when the vehicle 101 is in the first sub-area 207, the method further comprises a step of selecting a first reference path from the determined reference paths, the selection being made from information acquired by at least one sensor of the vehicle 101.

When the vehicle 101 is in the first sub-area 207, at least two reference paths were determined: the reference path to reach the ego-lane 212, and the reference path to reach the adjacent lane 213. The method is thus able to change reference path, which causes a change in the trajectory that the vehicle will take when the lateral positioning aid is activated.

In particular, information acquired by at least one sensor of said vehicle is the activated side of the turn signal, another vehicle in front of and traveling more slowly than said vehicle, a speed of said vehicle lower than a setpoint of the vehicle, and/or the lateral position of said vehicle in the widened area of said traffic lane. Thus, the lateral positioning of the vehicle will be different at the end of the first area 207, without any responsive action (a steering wheel angle, a steering wheel rotation speed, and/or a measured steering wheel torque below a threshold) on the steering wheel by the driver.

In another particular embodiment, when the vehicle 101 is in the second sub-area 208, the method further comprises a step of selecting a second reference path from the determined reference paths 212, 213, the selection is made only from at least one action on the steering wheel by the driver. In particular, changing the lateral positioning in the second sub-area 208 to follow a different reference path without action of the driver is awkward (sudden transition) and risky (not taking into account the traffic coming behind). The driver must take control of the lateral positioning of the vehicle by substantially exerting a torque on the steering wheel and/or a rotation of the steering wheel.

Also, advantageously, this step can be activated several times to be able to change the selection of the reference path as a function of new actions on the steering wheel by the driver.

FIG. 4 represents an example of a computer 107 device 401. This device 401 may be used as a device capable of implementing the steps of the method. This device 401 may take the form of a housing comprising printed circuits, any type of computer or even a mobile telephone.

The device 401 comprises a random access memory (MEM) 402 for storing instructions for implementation by a processor (PROC) 403 of the supervision method as described above. The device 401 also comprises a mass storage (BDD) 404 for storing data intended to be kept after the implementation of the method.

The device 401 may further comprise a digital signal processor (DSP) 405. This DSP 405 receives digital signals relating to data for shaping, demodulating and amplifying these data in a manner known per se.

The device 401 also comprises an input interface 406 for receiving the data read by the sensors from the steering wheel 103, from the dashboard 104, from the steering assistance system 105, from the members 106 able to drive the vehicle 101 in an automated manner along a reference path on a traffic lane 201, and/or from the device 107 which comprises environmental perception members, man-machine interfaces, and of control of the vehicle 101.

The device 401 comprises an output interface 407 for the transmission of the data and information calculated and/or transformed by the method.

The claimed invention is not limited to the embodiments described above by way of example; it extends to other variants. In particular, the method is suitable in instances of a lane of splitting into more than two lanes such as, for example, at the arrival of a highway toll area.

The invention claimed is:

1. A method for partitioning a widened area of a traffic lane bounded by two edges through which a vehicle can be driven by a driver in an automated manner along a reference path traveling in said traffic lane, said vehicle comprising an aid for laterally positioning said vehicle relative to the reference path, said method comprising the steps of:
   detecting a next splitting of said traffic lane into at least two new lanes;
   determining a widened area of said traffic lane;
   determining, in said widened area, at least two reference paths each of which is capable of reaching one of the new lanes;
   calculating a longitudinal distance relative to the beginning of said widened area, said longitudinal distance being a function of the reference paths and the edges of said traffic lane;
   determining a first sub-area of said widened area extending along said widened area from a beginning of said widened area for said longitudinal distance; a second sub-area of said widened area being determined as a complement of said first sub-area relative to the widened area, said second sub-area extending from an end of said first sub-area to an end of said widened area.

2. The method for partitioning a widened area of a traffic lane bounded by two edges according to claim 1, wherein the longitudinal distance is at least one element selected from:
   A geometry of the vehicle;
   A geometry of the traffic lane;
   A margin, an offset, and/or a predetermined value;
   A vehicle speed;
   A traffic conditions.

3. The method for partitioning a widened area of a traffic lane bounded by two edges according to claim 1, wherein the determination of the widened area is updated as long as the vehicle has not left the widened area.

4. The method for partitioning a widened area of a traffic lane bounded by two edges according to claim 1, wherein the first reference path is determined from one of the two edges of the traffic lane, and the second reference path is determined from the other edge of the two edges of the traffic lane.

5. The method for partitioning a widened area of a traffic lane bounded by two edges according to claim 1, wherein the calculation of the longitudinal distance relative to the beginning of said widened area is a function of the width of the lane relative to the width of the vehicle.

6. The method for partitioning a widened area of a traffic lane bounded by two edges according to claim 1, wherein when the vehicle is in the first sub-area, the method further comprises a step of selecting a first reference path from the determined reference paths, the selection being made from information acquired by at least one sensor of said vehicle;
   when the vehicle is in the second sub-area, the method further comprises a step of selecting a second reference path from the determined reference paths, the selection of the second reference path being made based only on at least one action on the steering wheel by the driver.

7. The method for partitioning a widened area of a traffic lane bounded by two edges according to claim 6, wherein information acquired by at least one sensor of said vehicle is the activated side turn signal, another vehicle in front of and traveling more slowly than said vehicle, a speed of said vehicle lower than a setpoint of the vehicle, and/or the lateral position of said vehicle in the widened area of said traffic lane, and wherein an action on the steering wheel by the driver is a rotation of the steering wheel and/or a torque applied to the steering wheel.

8. A device for partitioning a widened area of a traffic lane bounded by two edges, the device comprising a memory associated with at least one processor configured to implement the method according to claim 1.

9. A vehicle comprising the device for partitioning a widened area of a traffic lane bounded by two edges according to claim 8.

10. A computer program product comprising a memory storage device comprising computer executable instructions stored thereon suitable for executing the steps of the method for partitioning a widened area of a traffic lane bounded by two edges according to claim 1 when said computer program product is executed by at least one processor.

11. A method for partitioning a widened area of a traffic lane bounded by two edges through which a vehicle can be driven by a driver in an automated manner along a reference path traveling in said traffic lane, said vehicle comprising an aid for laterally positioning said vehicle relative to the reference path, said method comprising the steps of:
   detecting a next splitting of said traffic lane into at least two new lanes;
   determining a widened area of said traffic lane;
   determining, in said widened area, at least two reference paths each of which is capable of reaching one of the new lanes;
   calculating a longitudinal distance relative to the beginning of said widened area, said longitudinal distance being a function of the reference paths and the edges of said traffic lane;
   determining a first sub-area of said widened area between the beginning of said widened area and said longitudinal distance; a second sub-area being determined as a complement of said first sub-area relative to the widened area;
   wherein when the vehicle is in the first sub-area, the method comprises a step of selecting a first reference path from the at least two reference paths, the selection being made from information acquired by at least one sensor of said vehicle; and
   wherein, when the vehicle is in the second sub-area, the method comprises a step of selecting a second reference path from the determined reference paths, the selection of the second reference path being made based only on at least one action on the steering wheel by the driver.

12. A method for partitioning a widened area of a traffic lane bounded by two edges, through which a vehicle can be driven by a driver in an automated manner along a reference path traveling in said traffic lane, said vehicle comprising an aid for laterally positioning said vehicle relative to the reference path, said method comprising the steps of:
   detecting a next splitting of said traffic lane into at least two new lanes;
   determining a widened area of said traffic lane;
   determining, in said widened area, at least two reference paths each of which is capable of reaching one of the new lanes;
   calculating a longitudinal distance relative to the beginning of said widened area, said longitudinal distance being a function of the reference paths and the edges of said traffic lane;

determining a first sub-area of said widened area between the beginning of said widened area and said longitudinal distance; a second sub-area being determined as a complement of said first sub-area relative to the widened area, wherein when the vehicle is in the first sub-area, the method further comprises a step of selecting a first reference path from the determined reference paths, the selection being made from information acquired by at least one sensor of said vehicle; and wherein when the vehicle is in the second sub-area, the method further comprises a step of selecting a second reference path from the determined reference paths, the selection of the second reference path being made based only on at least one action on the steering wheel by the driver;

wherein the information acquired by at least one sensor of said vehicle is the activated side turn signal, another vehicle in front of and traveling more slowly than said vehicle, a speed of said vehicle lower than a setpoint of the vehicle, and/or the lateral position of said vehicle in the widened area of said traffic lane, and wherein an action on the steering wheel by the driver is a rotation of the steering wheel and/or a torque applied to the steering wheel.

* * * * *